United States Patent [19]
Yamanishi et al.

[11] 3,896,457
[45] July 22, 1975

[54] AUTOMATIC FOCUSING DEVICE

[75] Inventors: Akio Yamanishi; Yasuo Yamazaki, both of Osaka, Japan

[73] Assignee: Minolta Camera Kabushiki Kaisha, Osaka, Japan

[22] Filed: Nov. 29, 1973

[21] Appl. No.: 420,337

[30] Foreign Application Priority Data
Dec. 7, 1972  Japan.............................. 47-122034

[52] U.S. Cl................................. 354/25; 250/201
[51] Int. Cl. .............................................. G03b 3/10
[58] Field of Search ........ 354/25, 59, 195; 250/201, 250/204, 235

[56] References Cited
UNITED STATES PATENTS
3,450,018  6/1969  John, Jr. ................................ 354/25
3,504,610  4/1970  Dönitz .................................... 354/25
3,511,156  5/1970  Larks..................................... 354/25
3,688,673  9/1972  Katsuyama............................. 354/25
3,691,922  9/1972  König et al. .......................... 354/25
3,720,151  3/1973  Katsuyama............................. 354/25

Primary Examiner—Richard A. Wintercorn
Attorney, Agent, or Firm—Wolder & Gross

[57]                ABSTRACT

A camera automatic focussing mechanism includes a relay lens which is coaxial with the camera objective lens and forms on a coaxial predetermined area of a photosensitive element an image of a first image of an object formed by the objective lens on a first plane. A transparent serrated focus detecting member is located forward of the relay lens and is rotated or reciprocated so that a defocussed image on the first plane is oscillated on the photosensitive surface to produce an AC output signal in the absence of a proper focus. The AC output signal is employed to axially adjust the objective lens to a proper focus.

15 Claims, 9 Drawing Figures

AUTOMATIC FOCUSING DEVICE

BACKGROUND OF THE INVENTION

The present invention generally relates to improvements in focussing mechanisms and it relates particularly to an automatic focussing device, in which an image formed through an objective lens on a focus detecting plate is received by a light receptive element, and the objective lens is shifted along an optical axis commensurate to output signals produced by the light receptive element, whereby an image through the objective lens may be focused on a predetermined plane.

Heretofore, it has been known that responsive to output signals produced by a light receptive element which receives an image to be formed on a focus detecting plane through an objective lens, the objective lens is shifted along the optical axis to automatically focus the objective lens on the focus detecting plane.

The known art, however, presents difficulties in that output variation in the light receptive element during focussing and defocussing operations is sharply diminished in the vicinity of focussing point, such that it is almost impossible to obtain an optimum or accurate movement of the objective lens along the optical axis for the automatic focussing, and this results in great difficulty in obtaining accurate automatic focussing.

It is therefore an object of the present invention to provide an automatic focussing device, which ensures accurate focussing.

Another object of the present invention is to provide an automatic focussing device, wherein an image is formed on a focus detecting plane through an objective lens and there are produced AC output components in a light receptive element which receives the light of such an image, and the objective lens is shifted along the optical axis commensurate to AC output signals, so as to decrease the amplitude of the AC output components.

A further object of the present invention is to provide an automatic focussing device, in which in proportion to the enlargement of a circle of confusion of an image formed on the focus detecting plane through the objective lens, there are increased AC output components produced by the light receptive element which receives light of the image, and the objective lens is shifted along the optical axis, commensurate to the AC output signals thus produced, so as to decrease the amplitude of the AC output components.

A still further object of the present invention is to provide a photographic camera in which there is incorporated an automatic focussing device so arranged that in proportion to the size of a diffused light circle of an image formed on the focus detecting plane through the objective lens, AC output components produced in the light receptive element which receives light of an image are increased, and commensurate to the output signals, the objective lens is shifted along the optical axis thereof so as to decrease the AC output components, and the photographing is automatically effected by releasing a shutter.

SUMMARY OF THE INVENTION

To attain the above objects and other features of the present invention, the present invention contemplates the provision of an automatic focussing device, in which there is disposed a focussing prism member in parallel with a focus detecting plane on which an intended image is focussed through an objective lens, said focussing prism member having a surface consisting of a multi-grooved formation or serrations, whose slanted faces are directed at different angles to the optical axis of objective lens; the direction of refraction of light rays of an image to be formed on the focus detecting plane through the objective lens is cyclically varied by the focussing prism member being cyclically moved at a right angle to the optical axis of the objective lens, as the dimension of a circle of confusion of the image is increased; the aforesaid light partly enters a light receptive element through a relay lens, so as to produce in the light receptive element AC output components having a frequency corresponding to the cycle of the movement of the focussing prism member; and according to the AC signals thus produced, the aforesaid objective lens is shifted along the optical axis thereof so as to decrease AC output components. The focussing prism member may effect a linear oscillating movement along the direction of the focus detecting plane or may effect a uniform rotational movement about an axis parallel with the optical axis of the objective lens. In the former case, the prism member consists of two groups of surfaces opposite with respect to the optical axis of the objective lens and the optical axis of objective lens traverses in the mid point of two groups of surfaces, said axis being the center line for the linear movement of the focussing prism, the slanted faces of said surfaces being directed at an angle to the optical axis. The two areas of the two group surfaces are joined along a boundary line, i.e., a third surface perpendicular to the direction of the linear movement of the prism member. The third surface is suitably parallel to the optical axis of the objective lens. In the latter case, two types of slanted faces directed at different angles to the optical axis of objective lens are contiguous in parallel relation with one another.

It is preferable that the light receptive element and the relay lens are positioned on an extension of the optical axis of the objective lens, and this includes the case where the light on the extension of the optical axis of objective lens is reflected by a reflector, then the light receptive element and the relay lens are positioned on the optical axis of the reflected light ray.

DC output components of the outputs of the light respective element are advantageously cut off.

In case the automatic focussing device is employed for effecting the automatic focussing in a photographic camera, it is imperative that the automatic focussing device be actuated in association with the release operation of the camera, and after the termination of the automatic focussing, the following procedures are sequentially effected, exposure adjustment according to the light through the objective lens; diaphragm adjustment of the objective lens; shifting of the movable reflector from the viewing position to the picture taking position, if such a movable reflector is incorporated in the camera; and the shutter releasing.

DESCRIPTION OF THE PREFERRED EMBODIMENTS

Figure 1:
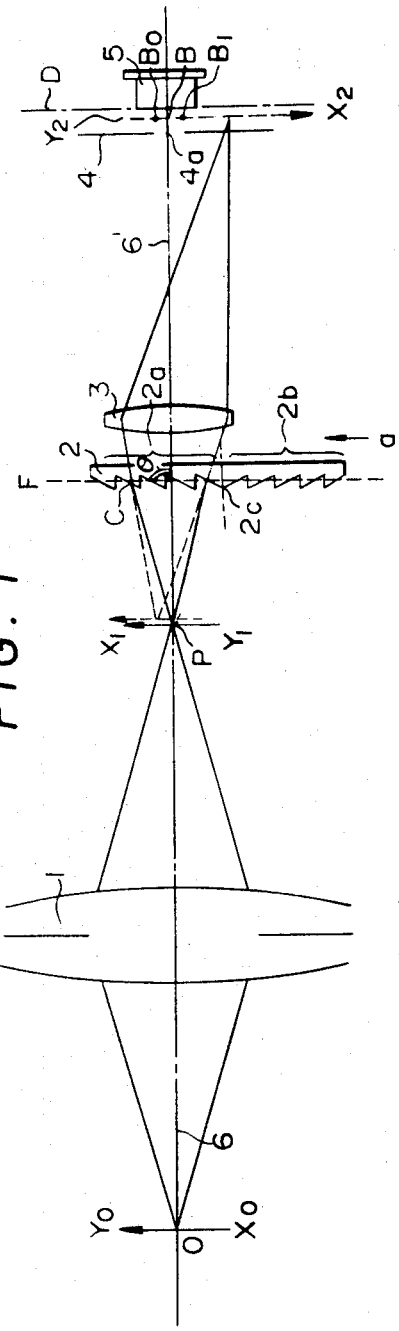
FIGS. 1 and 2 are longitudinal diagrammatic views illustrating the principle of a focussing prism member used in an automatic focussing mechanism embodying the present invention.
Figure 2:
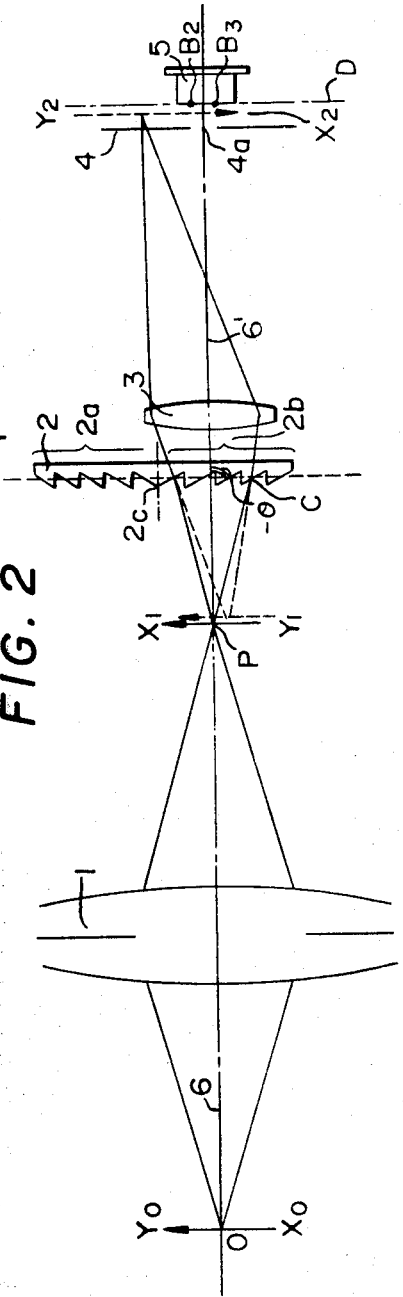

Referring particularly to FIGS. 1 and 2 which illustrate the principal of the present invention, it is assumed that a photographic object X0, Y0 which is positioned on a point 0 on the optical axis 6 of an objective lens 1, is focussed as image X1, Y1 through objective lens 1 on a point P on the optical axis of objective lens 1. Designated at 2 is a focussing prism member consisting of two areas 2a, 2b which are contiguous to each other in a mid portion of the prism member in which surface multi-grooved formations or serrations are provided. One area 2a has a surface provided with multi-grooved formations or serrations, having faces parallel to optical axis 6 and slanted faces each making an angle $\theta$ ($\theta < 90°$) with optical axis 6. The other area 2b is also provided with series of serrations, having faces parallel to optical axis 6 and slanted faces making an angle $-\theta$ with optical axis 6.

The focussing prism member 2 is disposed with a longitudinal center line of the multi-grooved serration being parallel to a focus detecting plane F, and the slanted faces making an angle $\theta$ or $-\theta$ with optical axis 6 having a point c positioned on the focus detecting plane F. Specifically, each slanted face has a thickness equal to the length of the horizontal face parallel to the optical axis, in the drawing, the thickness being shown in enlarged scale for better understanding. Accordingly, the actual thickness of each serration is so thin that it may be included within a focal depth when an image of photographic object is focussed through the objective lens on the focus detecting plane F. Where there is required the exact positioning of the slanted faces of each serration of the focussing prism member, the point c should be on a mid plane of the thickness of each serration.

Relay lens 3 is disposed on axis 6' which is coaxial with and geometrically extends through focussing prism member 2 from optical axis 6 of objective lens 1, and the geometrically extended axis 6' serves as the optical axis of relay lens 3. On the extension axis 6', there is disposed a light-shield screen 4 having a slitlike opening 4a. Rearwardly of the screen, there is disposed a photoelectric element 5 having a light receptive surface with its center located on the extension axis 6'.

Relay lens 3 is adapted to focus a focussing image formed or to be formed through objective lens 1 on the detecting plane F into an image on a surface D including the light receptive plane of photoelectric element 5, as well as all of the defocussed images to be formed by objective lens 1 on focus detecting plane F, closely adjacent to the aforesaid surface D. Accordingly, if such a relay lens is used as having a large F-number and a deep focal depth, detection of focus and control of the objective lens 1 for the focussing may be effected with high accuracy.

Assume that the area 2a of focussing prism member 2 is positioned on optical axis 6, as shown in FIG. 1, then light coming from an image X1 Y1 focussed on the point P on optical axis 6 are caused to refract downwardly by the serrations in the area 2a and are formed through relay lens 3, into an image X2, Y2 indicated by a dotted line closely adjacent to the plane D, in the case of the absence of light-shield screen 4, while in the presence of the light shield screen, the light from the image X1 Y1 is formed into part of image B0, B1 near to Y2 of the aforesaid image X2, Y2 adjacent to the light receptive surface of photoelectric element 5, and then such image is incident on the light receptive surface. In this case, the point of image P of the aforesaid image X1, Y1 on optical axis 6 is cut off by light shield screen 4.

If the focussing prism member is shifted in the direction of arrow a along the focus detecting plane F in a manner that the area 2b assumes the position of FIG. 2, with the serrations thereof located on optical axis 6, then light from the image X1, Y1 are all refracted upwardly by the prism slanted faces. In this case, in the absence of the light shield screen, the image X2, Y2 shown by the dotted line is formed adjacent to the plane D through relay lens 3, while in the presence of light shield screen 4, part of image B2, B3 adjacent to X2 of the image X2, Y2 passing through slit 4a of the screen 4 is incident on the photoelectric element 5, and the image on the point P on optical axis 6 is intercepted by light shield screen 4.

If focussing prism 2 is shifted in the direction of B in FIG. 2, then the status of FIG. 1 is restored.

Accordingly, through the cyclical shift of focussing prism member 2 from the position of FIG. 1 to that of FIG. 2, the brilliance of light rays of defocussed image X1, Y1 which is incident on photoelectric element 5 cyclically varies from the brilliance of the image B0, B1 to the brilliance of the image B2, B3, and as a consequence AC output signals are produced on the output side of photoelectric element 5. For increasing the AC output signals so as to ensure the accurate focus detection, a mesh pattern may be formed on the surface D on which the light receptive surface of photoelectric element 5 is disposed.

In case an image through objective lens 1 is focussed on the focus detecting plane F, the image will be formed on the point C, such that the image passes through relay lens 3 and enters as image B onto photoelectric element 5, in either status of FIG. 1 or FIG. 2. Accordingly, despite the cyclical movement of focussing prism member 2, the light incident on the light receptive surface of photoelectric element 5 is constant, and hence no AC output signal is produced.

Photoelectric element 5 used in the device may be a photoconductive cell, photo-diode, photo-avalanche diode, phototransistor or photo-multiplier tube, so far as these elements transduce light into electrical signals and present an excellent follow-up property, free from retardation.

Light shield screen 4 is in principle not essential, but may be avoided by limiting or otherwise delineating the light receptive surface of photoelectric element 5. The provision of the light shield screen will be helpful to improve AC output signals of photoelectric element 5 to thereby greatly enhance the accuracy in the automatic focussing performance to be hereinafter described.

Figure 3:
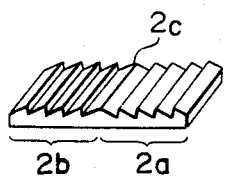
FIG. 3 is a perspective view showing a first embodiment of the focussing prism member of the present invention.
Figure 4:
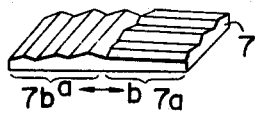
FIG. 4 is a perspective view showing a second embodiment of the focussing prism member.

FIG. 3 is a perspective view of the focussing prism 2 as shown in FIGS. 1 and 2, and FIGS. 4 and 5 show other examples of focussing prism members, shown with means for causing each focussing prism to effect a cyclical movement. In FIG. 4 there is exemplified a focussing prism 7 having multi-grooved formations or serrations which are arranged in side by side relation and in parallel relation with each other, said focussing prism consisting of two areas 7a and 7b which are arranged in the directions of a and b where the focussing prism effects a cyclical reciprocating movement. The arrangement of these two areas 7a, 7b are such that peak and base lines of the V-shaped formations of one area run at right angles with respect to those of other areas. With the focussing prism member 7 having such a construction, a direction of refracting a defocussing image detected on focus detecting plane F in the area 7a intersects the defocussing image refracting direction in the area 7b and it follows that the cyclical movement of the image varies from that of the example shown in FIG. 3. Accordingly, modification in shape of a slit-like opening 4a of light shield screen 4 is necessitated.

Figure 5:
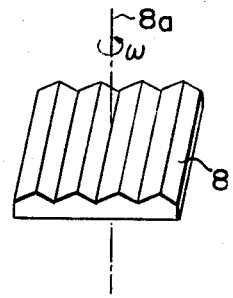
FIG. 5 is a perspective view showing a third embodiment of the same.

Focussing prism 8 shown in FIG. 5 consists of a single area having V-shaped formation with peak and base lines running unidirectionally and is adapted for effecting cyclically an equiangular velocity movement at an angular speed above axis 8a, as seen in FIG. 5.

With the focussing prism 8 shown in FIG. 5, a defocussing image, with rotation of the focussing prism, is split into two parts so as to be formed opposite with respect to a focussing point of a focussed image.

In either example of FIG. 4 or FIG. 5, in term of a defocussing image being detected on focus detecting plane F, the brilliance on the light receptive surface of photoelectric element 5 cyclically changes, thereby producing AC output signals in photoelectric element 5, while in terms of a focussed image, no AC output signal is produced.

Figure 7:
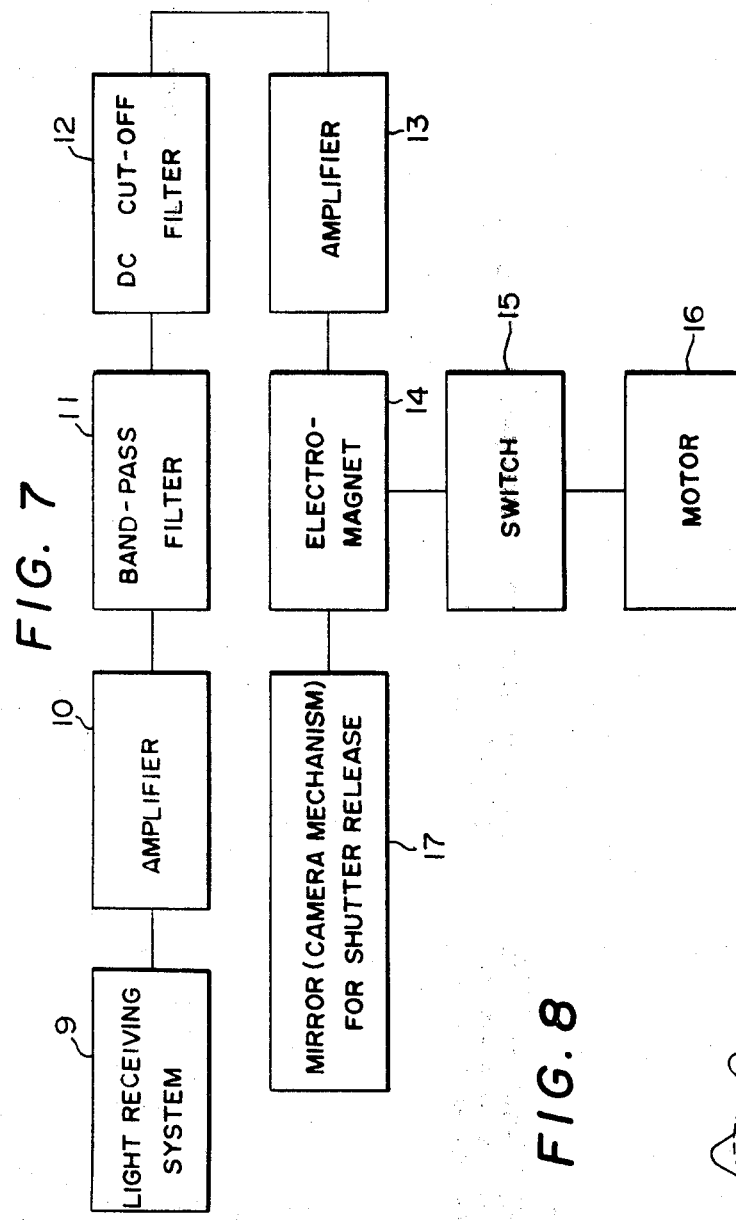
FIG. 7 is a block diagram of an electric circuit for operating the automatic focussing device of the above embodiment.
Figure 8:
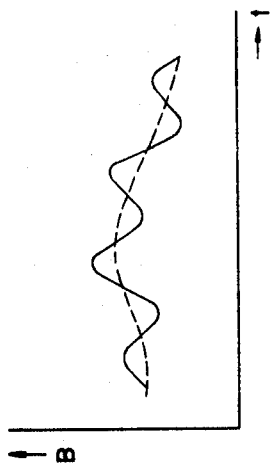
FIG. 8 is a plot representing outputs of a light receptive element incorporated in the automatic focussing device of the present invention.

FIG. 7 is a block diagram of a system for controlling the focussing of objective lens 1 by using AC output signals of the photoelectric element 5. The AC output signals of photoelectric element 5 are fed via light receiving system 9 into amplifier 10 whose output is filtered by a band-pass filter 11, which passes AC signals whose frequency coincides with the frequency of the cyclical movement of focussing prism (2, 7 or 8). In the event that an appreciably slight shift occurs on a photographic object such as by wind, or blur occurs on a hand held photographic camera, photoelectric element 5 products, even if an image is focussed, AC output signals as shown by the dotted line in FIG. 8. On the other hand, in case of a defocussing image, AC output signals as shown by the solid line in FIG. 8, are superimposed on the AC output signals according to the cyclical movement of the focussing prism member.

Band-pass filter 11 serves to remove the AC output signals having a different frequency which are based upon or correspond to the cyclical movement of the focussing prism member. The signals whose unwanted AC signals have been cut off are fed through a DC cut-off filter 12, in which DC components are cut off therefrom. Thus, AC signals based only upon the cyclical movement of the focussing prism member are amplified in amplifier 13, to thereby excite electromagnet 14, whereby switch 15 is closed to rotate motor 16.

If objective lens 1 is driven along its optical axis through the rotation of motor 16 and when the AC output signals become zero, the switch 15 is opened and the motor 16 is thus stopped, thereby achieving the automatic focussing. Block 17 is used for the electromagnet 14 to lock a mirror for use in the focussing. In a single lens reflex camera, a shutter is released by disengaging the mirror, such that upon the focussing, electromagnet 14 becomes demagnetized, to thereby unlock the mirror, whereby the shutter is automatically released.

Figure 6:
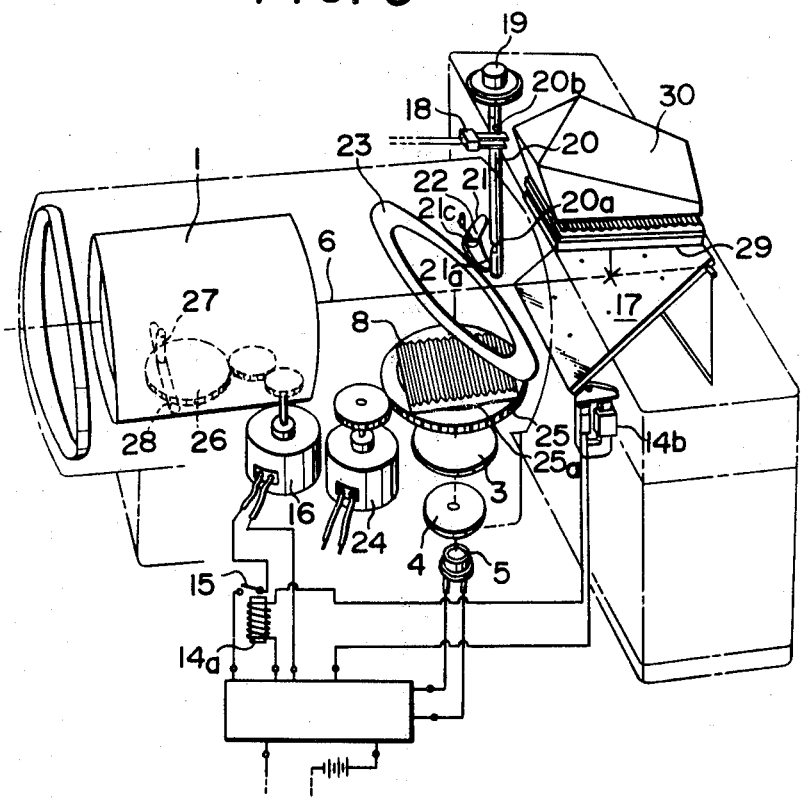
FIG. 6 is a perspective view of an essential part of a photographic camera incorporating the automatic focussing mechanism according to the present invention.

In FIG. 6 there is illustrated a preferred embodiment of the present invention in which the automatic focussing device is incorporated in a single lens reflex camera, the focussing prism member 8 shown in FIG. 5 being employed. Designated at 1 is objective lens 1, and at 17 a movable mirror. In addition to the movable mirror 17, there is provided an annular mirror 23 which intersects the optical axis of objective lens 1, making an angle of 45° with respect to said optical axis. Mirror 23 is fixedly mounted at the position as shown in FIG. 6. By mirror 23, only light rays traversing the peripheral border of objective lens 1 are reflected on focussing prism member 8.

The focussing prism member 8 is positioned on a turn-table 25 having a central opening 25a at a position along the length of the light path equal to that of the film, not shown, with respect to objective lens 1. Denoted at 3 is relay lens, at 4 light shield screen and at 5 photoelectric element.

In operation, if release button 19 is pushed, release rod 20 coupled thereto is urged downwardly to close power switch 18 by means of a pin 20b. At the same time, an arm 21a of a lock lever 21 is brought into engagement with a cut-away portion 20a of rod 20, lever 21 being rotatably journaled on a shaft 21c on the body proper of the camera and is urged to rotate in a counter-clockwise direction under the influence of a spring 22, and thus the rod 20 is locked, and in response to pushing down the release button, the mechanical restraint of mirror is released but in the defocus state said mirror is still restrained electrically by electromagnet 14b as described later. Therefore, even though the release button is pushed down the shutter is not released.

As the result of the power switch 18 being closed, a motor 24 is actuated to rotate turn-table 25. If an image traversing objective lens 1 is defocussed with respect to focussing prism 8, there will be produced on photoelectric element 5 AC output signals having a frequency related to the rotating speed of turn-table 25, whereby electromagnets 14a, 14b are excited, and thus switch 15 is closed by electromagnet 14a and movable mirror 17 is locked in a viewing position by electromagnet 14b.

By the closing of switch 15, motor 16 is actuated to cause the rotation of gear 26 by way of a chain of gears, whereby an actuating pin 27 causes objective lens 1 to shift along the optical axis thereof, the actuating pin being disposed on gear 26 and being in engaging relation with cam groove 28 provided in the inner periphery of the objective lens barrel. When an image on focussing prism 25 is focussed, the AC output signals from the photoelectric element 5 become null, whereby electromagnets 14a, 14b are deenergized to stop motor 16. Thus mirror 17 is unlocked to start rotating. Mirror 17, in the course of its rotation, is brought into engagement with lock lever 21 to rotate the same in the clockwise direction against the force of spring 22, whereby release rod 20 is unlocked. Upon the termination of the rotation of release lever 20, a shutter, not shown, is released by the known mechanism.

It is known in the art, for example, U.S. Pat. No. 3,533,343 and U.S. Pat. No. 3,687,026 to mechanically lock mechanical systems such as a movable mirror or a diaphragm actuating mechanism and to release such mechanical lock after the pushing of the release button. While in the embodiment of FIG. 6, the mechanical systems as described may be electromagnetically maintained by electromagnet 14b in the locked status after having been mechanically unlocked until the completion of automatic focussing, which is one of features of the improved mechanism.

Figure 9:
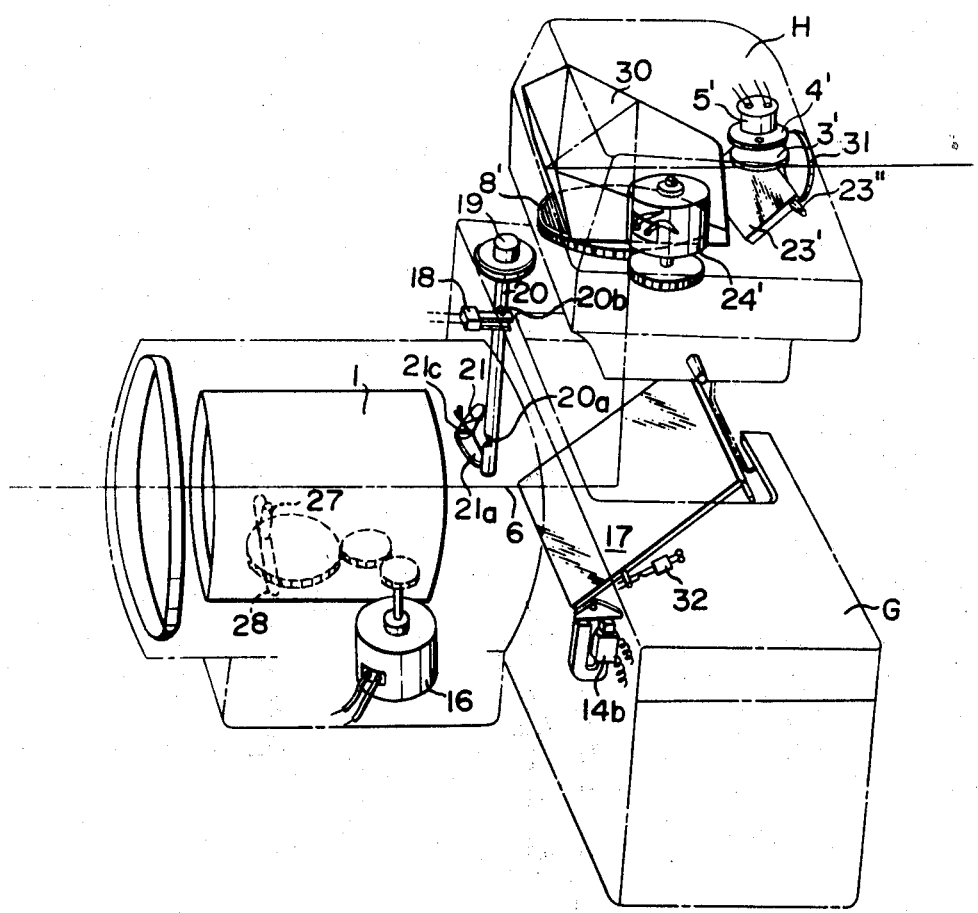
FIG. 9 is a perspective view showing the construction of the essential part of another embodiment of a photographic camera equipped with the automatic focussing mechanism of the present invention.

FIG. 9 shows another embodiment of an automatic focussing device used in a photographic camera, according to the present invention, wherein portions identical with those of the first embodiment are denoted by reference numerals the same as in FIG. 6, and members different in arrangement but similar in function are denoted by reference numerals with prime marks.

Disposed within the finder housing H removably secured to the camera body G are focussing prism member 8', relay lens 3', light shield screen 4' and photoelectric element 5', all of which constitute a light receiving optical system in the automatic focussing device. The focussing prism member 8' is positioned on the focus detecting plane of finder H and rotated by motor 24' arranged within finder housing H. Provided between a rear face of a pentaprism 30 and an ocular lens 31 is a second movable reflector 23' which is rotatable about a shaft 23'' between an automatic focussing position and a viewing position. When the second reflector 23' assumes an automatic focussing position between the rear face of pentaprism 30 and ocular lens 31, light rays of image coming from focussing prism 8' which are reflected by the second reflector 23' traverse a relay lens 3' and the opening in light shield screen 4' into photoelectric element 5'.

Within the finder housing H there is incorporated a circuit composed of amplifier 10, band-pass filter 11, DC cut-off filter 12 and AC amplifier 13, which are shown in FIG. 7, it goes without saying that 23' can be a translucent mirror.

In the second embodiment focussing prism member 8' for use in the distance-measuring, serves also as a focus detecting plane of the finder as well. Hence, the second movable reflector 23', unless the automatic focussing is effected, is rotated about the shaft 23'' from the position where the reflector 23' faces focussing prism 8' to the viewing position which is aside from the light path and where the reflector faces ocular lens 31.

Also in the second embodiment, the power switch 18 is closed by manipulating a release button, so as to actuate the automatic focussing device. It is imperative in this embodiment that the second movable reflector 17 be retained in the viewing position until termination of the automatic focussing.

In this connection, in the first embodiment, because light rays coming from the photographic object usually enter photoelectric element 5 of the automatic focussing device, the shutter must be locked until the termination of the automatic focussing, and for the purpose of controlling the shutter release, the movable reflector 17 is so arranged as to be retained in the viewing position. Meanwhile, in the second embodiment, it is a requirement to retain the first movable reflector 17 itself in the viewing position until termination of the automatic focussing, which is a distinction from the first embodiment.

Switch 32 is connected in series with power switch 18, between the current source and motor 16 for use in the automatic focusing. The switch 32 is adapted to be closed when the first movable reflector is in the viewing position and adapted to be opened when the same starts to move towards the picture taking position. The switch 32 serves to protect the focused image from an adverse influence due to any variation in the amount of light which enters the photoelectric element, such variation in an amount of light occuring from the shift of the first movable mirror 17 from the viewing position towards the picture taking position, after the termination of the automatic focussing. Another function of the switch 23 is to prevent a waste of power where a long-hour exposure is effected.

It will be understood that the above description is merely illustrative of the preferred embodiments of the invention. Additional modification and improvements can be readily anticipated by those skilled in the art from the present disclosure and such modifications and improvements may fairly be presumed to be within the scope and purview of the invention as defined by the claims which follow.

We claim:
1. An automatic focussing device comprising:
   an objective lens;
   a focus detecting plane for detecting a focus of an image to be formed through said objective lens;
   a focussing prism member disposed at said focus detecting plane including a first area having a light refracting characteristic and a second area having a light refracting characteristic different from that of said first area;
   means for cyclically reciprocating said prism member along said detecting plane in a direction perpendicular to the boundary between said areas to vary the refraction of said image;
   a photoelectric element disposed rearwardly of said focussing prism member on the geometrical extension of the optical axis of said objective lens and having a light receptive surface;
   a relay lens disposed between said focussing prism member and said photoelectric element which are positioned on said extension of optical axis, and focussing light of an image to be formed through said objective lens adjacent to a plane including said light receptive surface; and
   means for shifting said objective lens along the optical axis thereof so as to decrease AC output components from said photoelectric element which are responsive to the light incident thereon.

2. An automatic focussing device as claimed in claim 1 wherein said AC output components have a frequency equal to the frequency at which said refraction by said focussing prism member varies.

3. An automatic focussing device as claimed in claim 1, said first of said areas having a surface provided with serrations which consist of the faces substantially parallel to the optical axis of objective lens and faces directed at an angle to said optical axis and the second of said areas having a surface provided with second serrations which extend substantially at right angles to the direction of said first serrations.

4. An automatic focussing device as claimed in claim 1, said first area having a surface provided with serrations including first faces substantially parallel to the optical axis of objective lens and second faces directed at an angle to said optical axis, said serrations being arranged contiguously in side by side relation, said second area having a surface provided with serrations including faces substantially parallel to said first faces on the surface of said first area and faces directed at an angle to said second faces of the surface of said first area.

5. An automatic focussing device as claimed in claim 1 further comprising:
a light shield screen disposed forwardly of the photoelectric element;
said relay lens being disposed between said screen and said prism member; and,
extension of the optical axis of objective lens;
said light shield screen, said screen having an opening through which light of an image to be formed through the objective lens partly enters through said relay lens onto the light receptive surface.

6. An automatic focussing device as claimed in claim 1 further comprising:
a mesh-like screen pattern disposed in front of said light receptive surface and controlling the amount of light which enters the light receptive surface of the photoelectric element.

7. An automatic focussing device as claimed in claim 1 wherein said device comprises:
a band-pass filter circuit passing, among outputs produced in the photoelectric element, AC components having a frequency equal to the frequency of variation of the image refraction by the focussing prism member;
a filter circuit into which is fed the outputs from said band-pass filter circuit and which blocks the DC component;
an electromagnet actuated by the output of said DC blocking filter circuit; and,
at least a switch closed through the excitation of said electromagnet and connected to a motor which drives the objective lens along the optical axis so as to decrease output of said DC blocking filter circuit.

8. An automatic focussing device for use in a photographic camera which includes an objective lens, a focus detecting plane, a camera actuating mechanism, and a shutter mechanism having a shutter which is released by the operation of said camera actuating mechanism, comprising:
a photoelectric element having a light receptive surface positioned to receive the light of an image to be formed through the objective lens;
a control circuit to which outputs of said photoelectric element are fed as inputs;
an electromagnetic means actuated by outputs of said control circuit;
a motor for driving said objective lens along the optical axis;
means for closing a circuit of said motor controlled by said control circuit; and,
means for locking and releasing said camera actuating mechanism in association with the operation of said electromagnetic means.

9. An automatic focussing device for use in a photographic camera as claimed in claim 6, wherein said camera actuating mechanism includes a movable reflector adapted to be locked at the viewing position with the actuation of said electromagnetic means and to move from the viewing position to the picture taking position in association with the de-actuation of said electromagnetic means.

10. An automatic focussing device for use in a photographic camera as claimed in claim 8, wherein said closing means of said motor circuit includes a relay switch operated by said control circuit.

11. An automatic focussing device for use in a photographic camera as claimed in claim 8, further comprising:
a release lever actuated in association with the release operation;
a power switch for said control circuit closed by the actuation of said release lever; and,
a locking member locking said release lever in the operative position and releasing said release lever from the locked position in association with the operation of the camera actuating mechanism.

12. An automatic focussing device for use in a single lens reflex camera as claimed in claim 8, which includes a reflector movable between a viewing position and a picture taking position, further comprising:
a normally open power switch for the control circuit, closable in association with the release operation; and,
a switch connected in series with said power switch, said switch being closed when said reflector assumes a viewing position and opened simultaneously when said reflector starts to shift from the viewing position to the picture taking position.

13. An automatic focussing device as claimed in claim 1, wherein said first area has a plurality of elongated prisms arranged in parallel with each other, and said second area has a plurality of elongated prisms arranged in parallel with each other at an angle inclined to the prisms of said first area.

14. An automatic focussing device as claimed in claim 13, wherein each of said prisms of the first and second areas has a first face directed at an angle to the optical axis of said objective lens and a second face directed at an angle to said first face.

15. An automatic focussing device as claimed in claim 14, wherein said second face is further directed at an angle to the optical axis of said objective lens.

* * * * *